(12) United States Patent
Meek et al.

(10) Patent No.: US 7,984,158 B2
(45) Date of Patent: Jul. 19, 2011

(54) WEB SERVICE FOR COORDINATING ACTIONS OF CLIENTS

(75) Inventors: Brian Meek, Redmond, WA (US); Hans Andersen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/725,828

(22) Filed: Mar. 20, 2007

(65) Prior Publication Data

US 2008/0235384 A1    Sep. 25, 2008

(51) Int. Cl.
  *G06F 15/16*    (2006.01)
(52) U.S. Cl. ......................... 709/227; 709/228; 709/229
(58) Field of Classification Search .................. 709/228, 709/229, 227
  See application file for complete search history.

(56) References Cited

U.S. PATENT DOCUMENTS

| | | | |
|---|---|---|---|
| 5,867,494 A * | 2/1999 | Krishnaswamy et al. .... | 370/352 |
| 6,363,396 B1 * | 3/2002 | Klots et al. ................ | 707/103 Y |
| 6,604,129 B2 | 8/2003 | Slutsman et al. | |
| 6,956,937 B2 | 10/2005 | Kotik et al. | |
| 6,996,605 B2 | 2/2006 | Low et al. | |
| 7,152,093 B2 | 12/2006 | Ludwig et al. | |
| 2002/0055950 A1 * | 5/2002 | Witteman ................... | 707/500.1 |
| 2003/0023877 A1 * | 1/2003 | Luther et al. .................. | 713/201 |
| 2003/0044017 A1 * | 3/2003 | Briscoe .......................... | 380/277 |
| 2003/0223381 A1 | 12/2003 | Schroderus | |
| 2004/0054723 A1 * | 3/2004 | Dayal et al. ................... | 709/204 |
| 2004/0210663 A1 * | 10/2004 | Phillips et al. ................ | 709/230 |
| 2004/0249972 A1 * | 12/2004 | White et al. ................... | 709/243 |
| 2005/0021617 A1 * | 1/2005 | Rusitschka ................... | 709/204 |
| 2005/0034079 A1 * | 2/2005 | Gunasekar et al. .......... | 715/753 |
| 2005/0114674 A1 | 5/2005 | Carley | |
| 2005/0188085 A1 * | 8/2005 | Lin et al. ....................... | 709/225 |
| 2005/0223102 A1 * | 10/2005 | Zhang et al. .................. | 709/228 |
| 2005/0232160 A1 | 10/2005 | Kotik et al. | |
| 2005/0259819 A1 * | 11/2005 | Oomen et al. ................ | 380/200 |
| 2006/0036747 A1 * | 2/2006 | Galvin et al. ................. | 709/228 |
| 2006/0085545 A1 * | 4/2006 | Borella et al. ................ | 709/227 |

(Continued)

FOREIGN PATENT DOCUMENTS

WO    WO2004049678 A1    6/2004

OTHER PUBLICATIONS

"SIP, RTP, and XMPP in the Emerging Real-Time Internet", Date: Oct. 2006, http://www.jabber.com/index.cgi?CONTENT_ID=619&VMX_TRACKED=YES.

Amit Gupta, "Multi-party Real-time Communication in Computer Networks", Date: Feb. 1996, http://www.eecs.berkeley.edu/Pubs/TechRpts/1996/CSD-96-896.pdf.

(Continued)

*Primary Examiner* — John Follansbee
*Assistant Examiner* — Imad Hussain

(57) ABSTRACT

Architecture for providing communications resources of a network for client intercommunications. A client that desires to communicate makes a request to an arbitrary communications server node by the announcing of identifying information. The web service "parks" the request until the identifying information is ready. A second client can ultimately interact with the first client by sending identifying information and following the same lookup path to find the location at which the first client request is "parked". A continuous hash is employed that enables a client to negotiate services of a resource and via which resource multiple clients can rendezvous for communications. The continuous hash minimizes the disruption to clients already accessing network resources. A resource is brought online or taken offline without dramatically impacting ongoing use of currently operational resources. In the event a hosting resource fails, the clients repeat the lookup process and re-converge on a new server.

15 Claims, 14 Drawing Sheets

U.S. PATENT DOCUMENTS

| | | |
|---|---|---|
| 2006/0098086 A1 | 5/2006 | Chandra et al. |
| 2006/0259897 A1* | 11/2006 | Zorn et al. .................... 717/118 |
| 2007/0079004 A1* | 4/2007 | Tatemura et al. ............. 709/238 |
| 2007/0143840 A1* | 6/2007 | Arroyo et al. .................. 726/21 |
| 2007/0174429 A1* | 7/2007 | Mazzaferri et al. ........... 709/218 |

OTHER PUBLICATIONS

Gupta, et al., "Resource Sharing for Multi-Party Real-Time Communication", Date: 1995, http://ieeexplore.ieee.org/iel3/3882/11308/00516002.pdf?isNumber=.

* cited by examiner

WEB SERVICE FOR COORDINATING ACTIONS OF CLIENTS

BACKGROUND

Networks provide the basis for a wide variety of services for many different devices and users. Providers strive to make data and information accessible to users from all network-accessible locations. Traditionally, data access involves some level of latency where the data is posted or stored at one location and which can be accessed by the user at a later time. E-mail is such an example where communications latency occurs by the messages being sent through a network of mailers and servers until the recipient downloads and reads the message.

However, rather than use realtime infrastructures such a telephone systems with limited interactive capabilities, businesses and users alike are demanding more effective and efficient realtime IP communications methodologies. A rapidly evolving technology is online collaboration where computing systems access IP-based services for multi-client interaction. Here, users can interact using not only voice, but many other types of multimedia such as text, graphics, images, and video.

In a multi-party realtime application such as online collaboration it is common for several parties to rendezvous on a common resource (e.g., network service) selected from a pool of resources. However, what typically occurs is that the utility of the service is realized by the users and demand begins to outstrip the available support and resources. Growth can be managed by limiting the number and type of users, for example. However, this can become costly in terms of human, as well as software and hardware management. Ideally, as the number of users fluctuates, the resources supporting the service should scale to the demand. Moreover, as users take advantage of the services by connecting and disconnecting, the pool of resources supporting the services should, ideally, expand and contract without disrupting other connected users, but more practically, not disrupt more than a small percentage of the overall user population, if any users at all.

Web-based access is becoming widely accepted as a preferred means for accessing services. In a web-based service application, it is common for many of the users to be restricted to making outbound HTTP (hypertext markup language) connections. When using a web service with a database backend the users can communicate and coordinate access using polling, but this introduces unnecessary traffic and delays as the user polls for changes. Conventional web-based systems lack mechanisms for providing efficient realtime intercommunications for clients.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a mechanism for providing communications resources for clients of a network. One resource of an existing multi-resource environment can be brought online or taken (or fail) offline without dramatically impacting ongoing use of the resources that remain online and operational. Resources are not checked out from or checked back in to a resource pool as in conventional systems, rather the resource makes itself available.

The architecture employs a continuous hash that enables a client to negotiate services of a resource and via which resource multiple clients can rendezvous for communications. The nature of the continuous hash used for mapping names to servers minimizes the disruption to clients connected directly to a lost server.

In a communications implementation, a first client can access a network resource via a web service for client communications. Communications resources can then be assigned and made available to multiple clients for communicating with the first client. In operation, a client that desires to publish information makes a request against an arbitrary communications server node by the announcing of identifying information (e.g., a client or user name, an e-mail address, . . . ) for the information. The contacted web server performs a lookup operation for a resource (e.g., which resource can be the server itself) for handling the announcement using the identifying information, processing the identifying information through a hash function, and selecting the resource based on criteria for hash values of a hash continuum. The initially contacted server redirects the client to selected resource as the location the client will use for exchanging information with the other clients. At this destination server, the web service "parks" this request until the client information is ready.

A second client (or multiple other clients) can send information to (or interact with) the first client by following the same lookup path to find the location at which the first client is "parked". Once the resource is found, the second client can send a request (or message) that contains the information the second client wants to send to the first client. The web service then responds to the first request with the information or message. This results in immediate notification to the first client of the changed data or message. This implementation can be generalized for multiple clients to subscribe to a single notification.

In the event the server hosting the client rendezvous fails, the clients can repeat the lookup process and re-converge on a new server. The continuous hash facilitates a smooth transition to a different resource.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
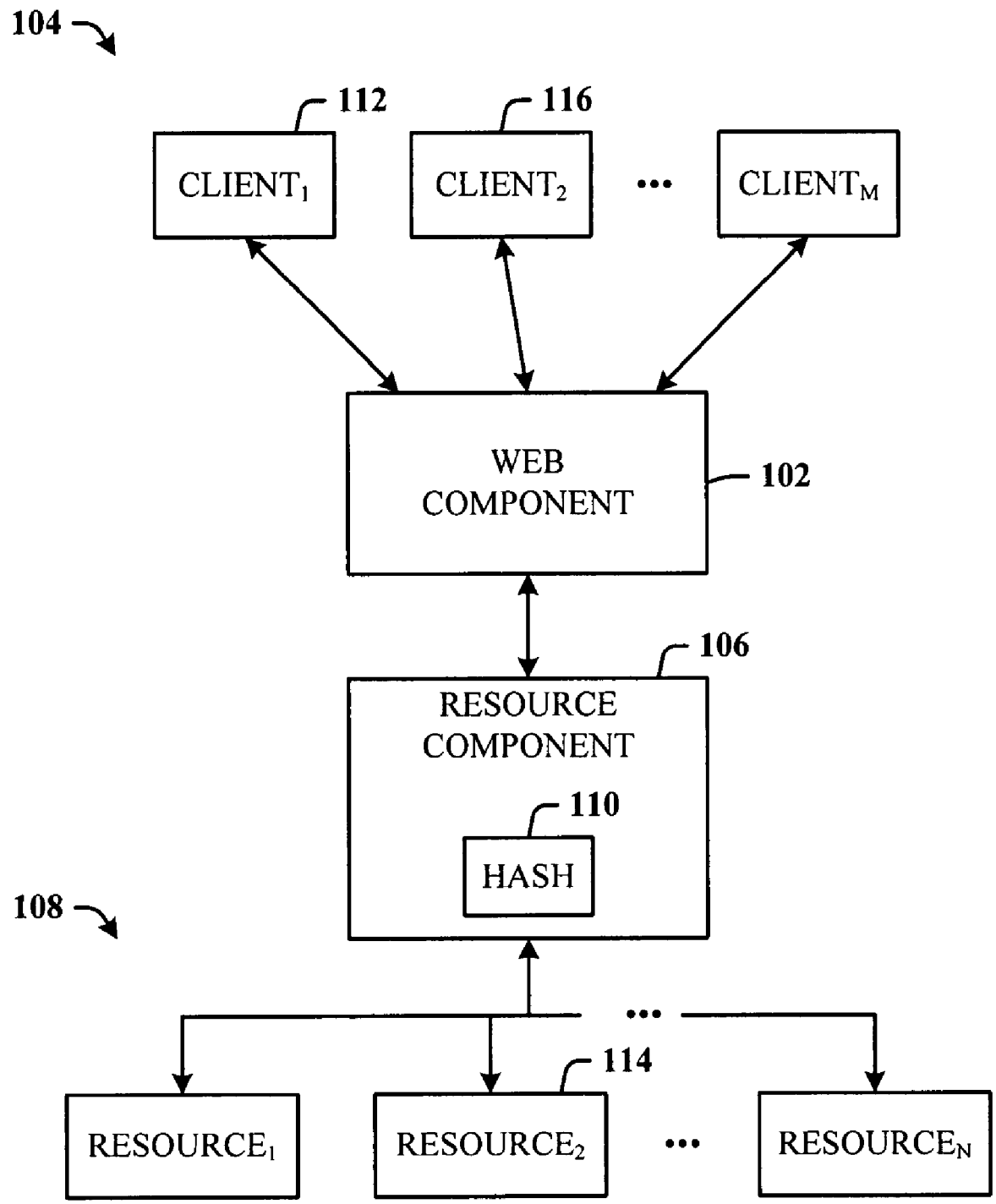
FIG. 1 illustrates a computer-implemented multi-client management system.

The disclosed architecture utilizes a web service for the coordination of actions between two or more clients. A higher level join negotiation protocol is provided that employs a continuous hash for accessing network resources. For example, a first client publishes a data collaboration session under a name (e.g., the client user name). Subsequent clients intending to communicate with the first client can send requests to join the session using that same name. The first client can then respond by admitting or rejecting the subsequent clients. Resources for supporting the multi-party session are allocated according to the name and hash of the name relative to hashed values for each of the available resources.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented multi-client management system 100. The system 100 includes a web component 102 (e.g., a web service) for receiving a request from one of multiple clients 104 (denoted $CLIENT_1, \ldots, CLIENT_M$, where M is a positive integer), and ultimately, for multi-client intercommunications. A resource component 106 of the system 100 is provided for dynamically assigning one or more of a plurality of communications resources 108 (denoted $RESOURCE_1, \ldots, RESOURCE_N$, where N is a positive integer) using a continuous hash 110, the resource(s) 108 assigned based on identifying information provided by the client in association with the request.

In one implementation, the web component 102 is a single web service that a user (or client) accesses for establishing a session for multi-client (or multi-party) communications. In an alternative embodiment, the web component 102 includes multiple web services each hosted on disparate network nodes. A client can then randomly or arbitrarily access one of the nodes and employ the associated web service to establish the multi-party communications session using one of the resources 108.

A resource of the available resources 108 can be brought online or taken (or fail) offline without dramatically impacting ongoing use of the resources that remain online and operational. Moreover, adding a new session to an operating resource does not dramatically impact ongoing use of the resource by other users.

Resources are not checked out from or checked back into a resource pool as in conventional systems, or allocated based on loading, rather the resource is made available based on a requested need.

In operation, a client (e.g., a first client 112) that desires to publish information to other clients first issues a request for services against any one of a potential number web service nodes of the web component 102, and by announcing or providing a name for the information. For example, the name could be "session for product group". The name provided to the initially-contacted web server of the web component 102, which name can be part of the request process, is hashed into a value by the hash 110 and compared to values (e.g., hashed) of the available resources 108.

A first resource 114 is selected based on a relationship between the hashed name value and a value associated with the first resource 114. It is possible the web server, itself, which the first client 112 initially accessed, and when included as a possible resource of the resources 108, could be assigned as the resource to handle the session based on comparison of the hashed name value and resource values.

The initially-contacted web server then re-directs the first 112 client to the selected resource 114 as the resource the first client 112 will use for multi-party communications with other clients 104. The initially-contacted web service "parks" the first client request at the first resource 114 until the information that the first client 112 desires to communicate is ready.

A second client 116, by way of arbitrarily accessing one of the disparately-hosted web services of the web component 102, can send information to the first client 112 via the assigned first resource 114 by following the same lookup path forged using the name provided by the first client 112. In other words, the first client 112 simply communicates the name information (e.g., "session for product group") to each of the other clients 104 that are to be party to the session. When each of the other clients 104 accesses a web service of the web component 102, the name information is submitted and processed according to the same hash to find the first resource 114 at which the first client request is "parked".

Once the first resource 114 is found, based on the name information provided by the second client 116, information provided by the second client will be automatically communicated (e.g., in realtime) to the first client 112. In one implementation, the second client 116 can be presented with a notification as to the success or failure of finding the allocated first resource 114, before the second client 116 begins sending information to the first client 112. In an alternative implementation, the second client 116 can provide the name information in a specified field of a user interface (UI) (e.g., subject line) and include the message information with the name information, such that location processing to find the first resource 114 and communication of the message information occur sequentially and in near realtime as perceived by the second client 116. In still another implementation, the first client 112 can park (or queue) information desired to be communicated at the first resource 114 such that once the second client 114 enters the session (or connects to the first resource 116), the parked information is immediately communicated to the second client 116.

In one embodiment, not only is the name information hashed, but also other information which indicates that a change has occurred in the information being communicated (e.g., message content). Thus, once a change in the hash is detected, this results in immediate notification to the first client 112 of the changed data or message.

Subsequent multi-party communications between the first client 112 and the second client 114 can then occur through the corresponding web services and the selected first resource 114, bypassing the resource component 106. Alternatively, multi-party communications between the first client 112 and the second client 114 can then occur directly through the selected resource 114, bypassing the resource component 106 and the initially-contacted web services, thereby relieving the web services for other operations. As long as the hashing algorithm 110 is accessible for redirecting traffic, if needed, multi-party communications can be obtained and maintained across one or more of the resources 108.

The pattern can be generalized to have multiple parties subscribe to a single notification, similar to a broadcast process. Moreover, in the event the first resource 114 hosting the rendezvous (or session) fails, the clients 104 repeat the lookup process and re-converge on a new resource. The nature of the hash 110 (e.g., a continuous hash) used for mapping names to resources 108 minimizes the disruption to the clients 104 connected directly to the failed resource (e.g., first resource 114).

Figure 2:
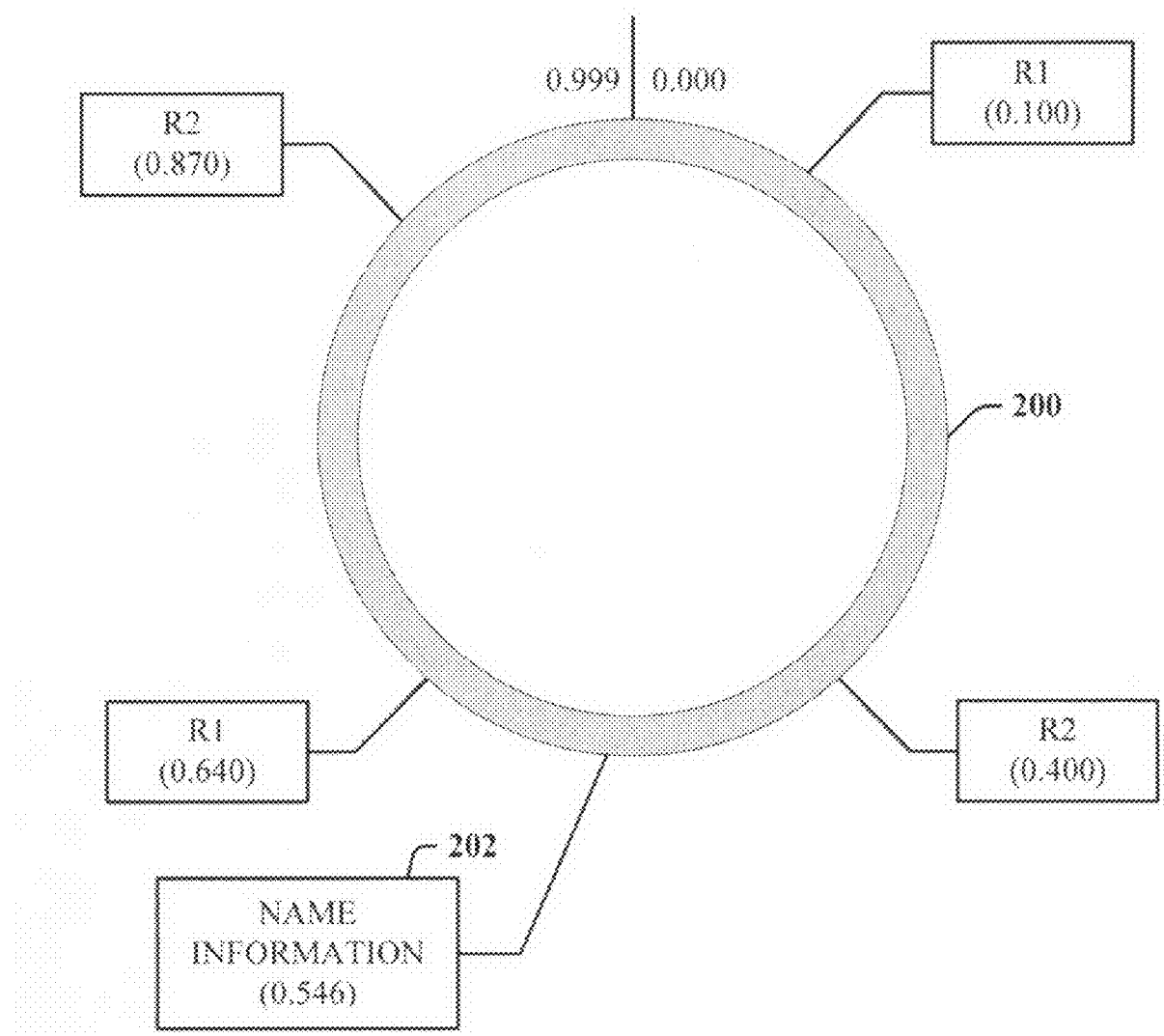
FIG. 2 illustrates a continuum that represents a continuous hash employed for identifying and selecting resources for supporting multi-client intercommunications.

FIG. 2 illustrates a continuum 200 that represents a continuous hash employed for identifying and selecting resources for supporting multi-client intercommunications. The architecture employs a continuous hash that enables a client to negotiate services of a resource and via which resource multiple clients can rendezvous for communications. Here, two resources (R1 and R2) are available for supporting client communications. A first resource (R1) has two entries on the continuum 200: a first R1 entry with a value of 0.100 and a second R1 entry with a value of 0.640. Similarly, a second resource (R2) has two entries on the continuum 200: a first R2 entry with a value of 0.400 and a second R2 entry with a value of 0.870.

In this example, the request provided by the first client can include name information 202 (e.g., an e-mail address) that is hashed into a name information entry on the continuum 200 with a value of 0.546.

A resource (e.g., resource R1 or resource R2) can be selected based on predetermined relationship criteria or rules that define how the resources will be allocated relative to the hashed name (or name information) value 202. For example, in one embodiment, the resource associated with a resource value greater than the hashed name value but closest thereto (e.g., resource R1 at value 0.640) can be selected as the resource to support the session. In an alternative embodiment, a resource associated with a resource value less than the hashed name value but closest thereto (e.g., resource R2 at 0.400) can be selected.

Note also that the number of entries in the continuum 200 for a first resource can be greater than the entries for a second resource. This should, in probability, facilitate an increased load on the first resource relative to the second resource. However, this need not be the case, depending on the hashed name value 202 in relation to the resource values. Entries for resources can be evenly distributed on the continuum 200 to, probabilistically, provide a more distributed load across the available resources.

The continuum 200, continuum values, and associated resources information can be replicated among the resources 108 of FIG. 1 for failover processing. For example, if the resource on which the clients are in session, fails, the session and clients can be re-established on another resource using the replicated continuum 200. This is facilitated via the name information-to-value mapping stored on the continuum 200 such that any communication by a client that includes the name information will automatically be routed to the next closest resource, if this is the criteria for assigning a resource.

Note that a resource is not necessarily physical machine-based, but can be related to operating services. In other words, a resource can be one of many services running on a single machine. For example, a physical server machine can be running virtual machines, such that when a first virtual machine fails, the services running thereon go offline, but the services running on a second virtual machine remain operational. Thus, the physical machine stays online, but a virtual machine may fail. Allocation of virtual machine resources follows the same processes described herein.

Figure 3:
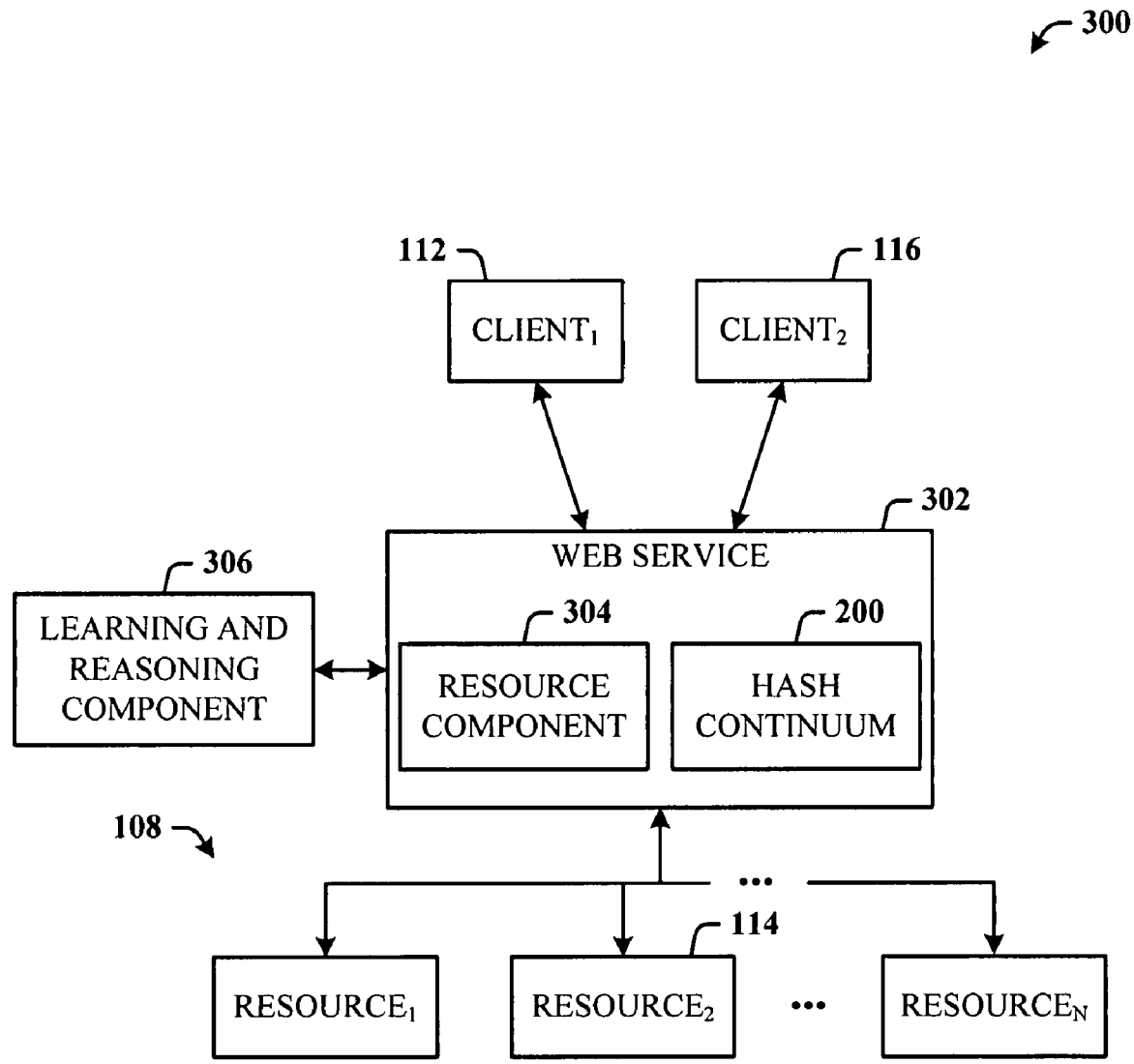
FIG. 3 illustrates a system that employs machine learning and reasoning which facilitates managing and/or automating one or more features.

FIG. 3 illustrates a system 300 that employs machine learning and reasoning (MLR) which facilitates managing and/or automating one or more features. Automation can be associated with resource allocation, resource loading, and load balancing, for example. Here, the system 300 include a single web service 302 that facilitates request and name processing for resource allocation, loading, load access and multi-party intercommunications. The service 302 includes a resource component 304 (similar to resource component 106 of FIG. 1) and the hash continuum 200 (which includes values mapped to resources and name information). The resource component 304 facilitates the assignment of a session to one of the resources 108 based on a hash value. For example, the first and second clients 112 and 116) can be assigned to and conduct communications via the first resource 114.

The system 300 can also include an MLR component 306. The subject architecture (e.g., in connection with selection) can employ various MLR-based schemes for carrying out various aspects thereof. For example, a process for determining how many resource entries to allow in a hash continuum can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data.

Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one embodiment, the MLR component 306 learns that the users are associated with a geographic location. Accordingly, the session can be assigned to a resource in the same general geographic area to provide improved bandwidth and connectivity. In another example, the MLR component 306 can learn and reason about session assignments to particular resources, and based on that information, increase entries to the continuum 200 for a more reliable resource relative to a resource that is less reliable. Alternatively, the entries for the less reliable resource can be reduced. In yet another example, learning and reasoning can be employed to smooth distribution of sessions across the available resources. Smoothing can be based on temporal information such as time of day, day of the week, etc.

In all cases, once a second or subsequent clients attempt to join a session, the first client can respond by admitting or rejecting clients on a case-by-case basis.

Figure 4:
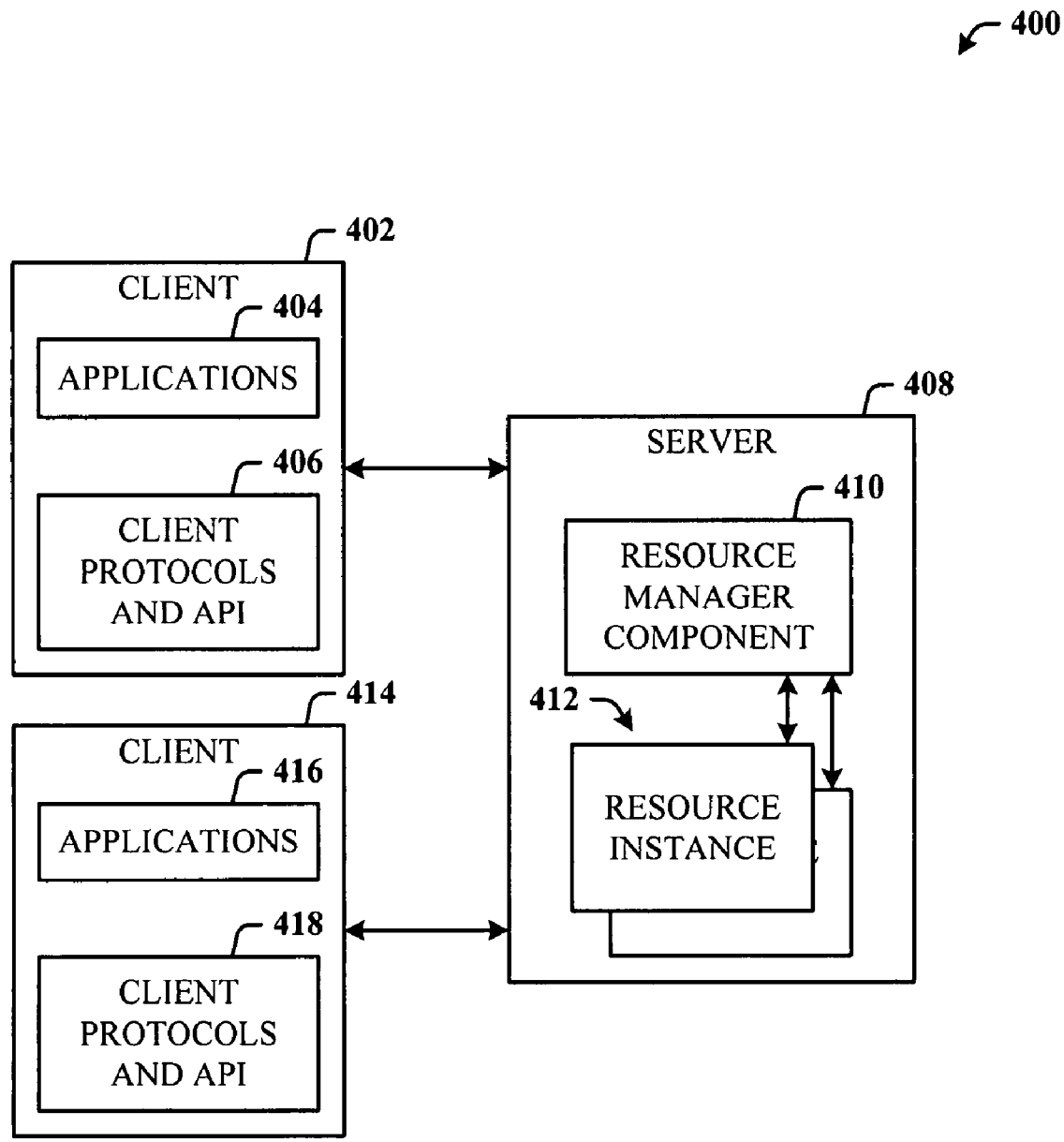
FIG. 4 illustrates an exemplary client/server system for multi-party management and communications.

FIG. 4 illustrates an exemplary client/server system 400 for multi-party management and communications. The system 400 include a first client 402 running one or more applications 404 (e.g., word processor, spreadsheet, voice program, and drawing program) that can be used during a session to communicate data and other information. The first client 402 further includes client protocols and APIs 406 for interacting with a server 408 that facilitates access to resources. The protocols can include SOAP (simple object access protocol) for accessing a resource manager component 410 of the server 408 and PSOM (persistent system object model) transports for accessing one or more resource instances 412 created and running on the server 408. Direct connection can be secure using TLS (transport layer security) or HTTPS (HTTP secure) tunneling, for example.

A second client 414 running one or more applications 416 (e.g., word processor, spreadsheet, voice program, and drawing program) that can be used during the session to communicate data and other information seeks access to the session via client protocols and APIs 418 for interacting with the server 408 for further access to resources. The client protocols can include SOAP for accessing the resource manager component 410 and PSOM transports for accessing the one of the resources instance 412 assigned to the first client request, for example, or any application-specific protocol.

Figure 5:
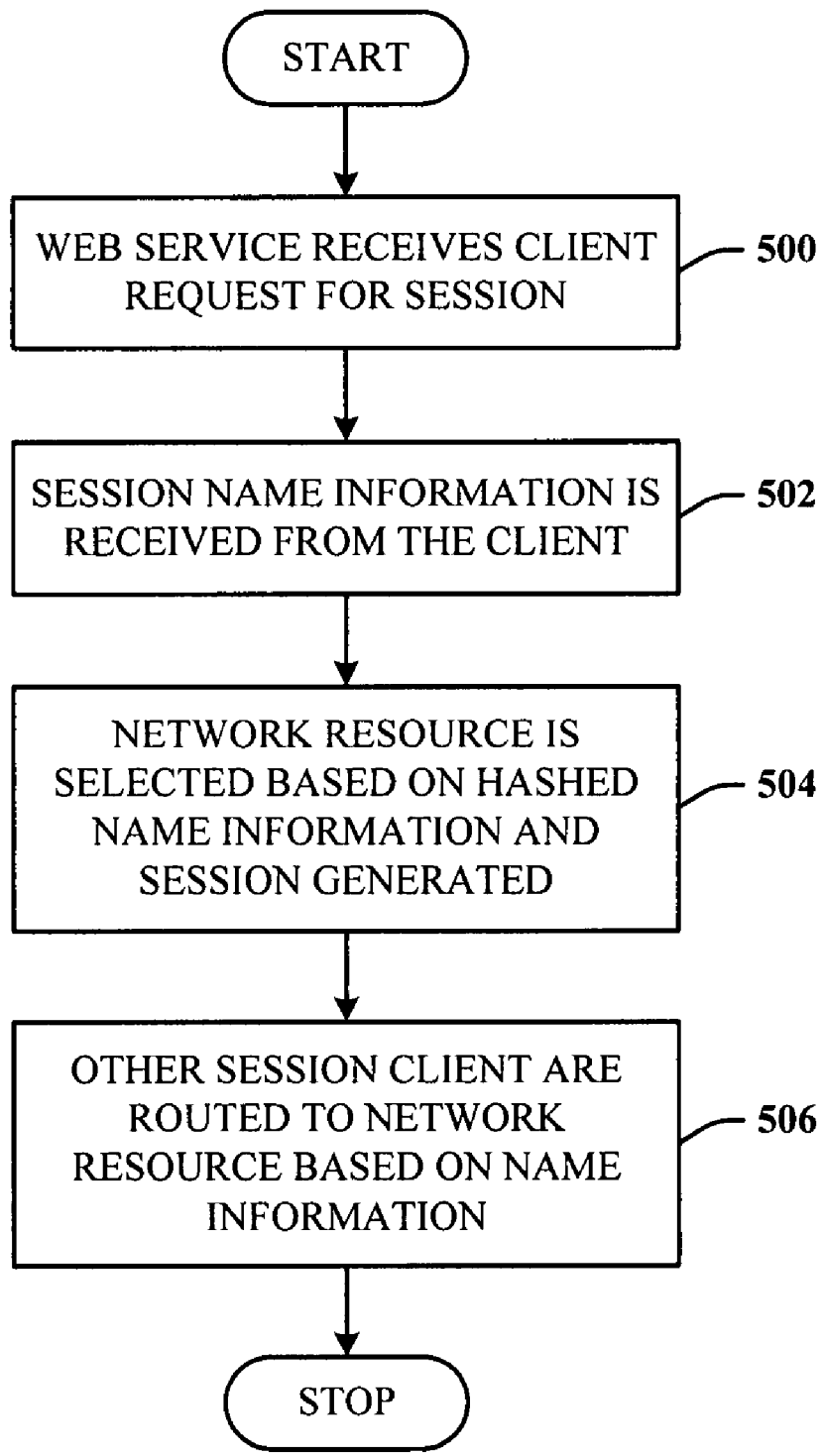
FIG. 5 illustrates a method of generating and selecting network resources for multi-party communications.

FIG. 5 illustrates a method of generating and selecting network resources for multi-party communications. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 500, a client request is received for establishing a multi-client session via a web service, the request associated with session name information. At 502, session name information is received from the client. At 504, the network resource is selected based on the hashed name information, and a session is generated. At 506, other clients intended for the session are automatically routed to the network resource based on the other client supplying the name information.

Figure 6:
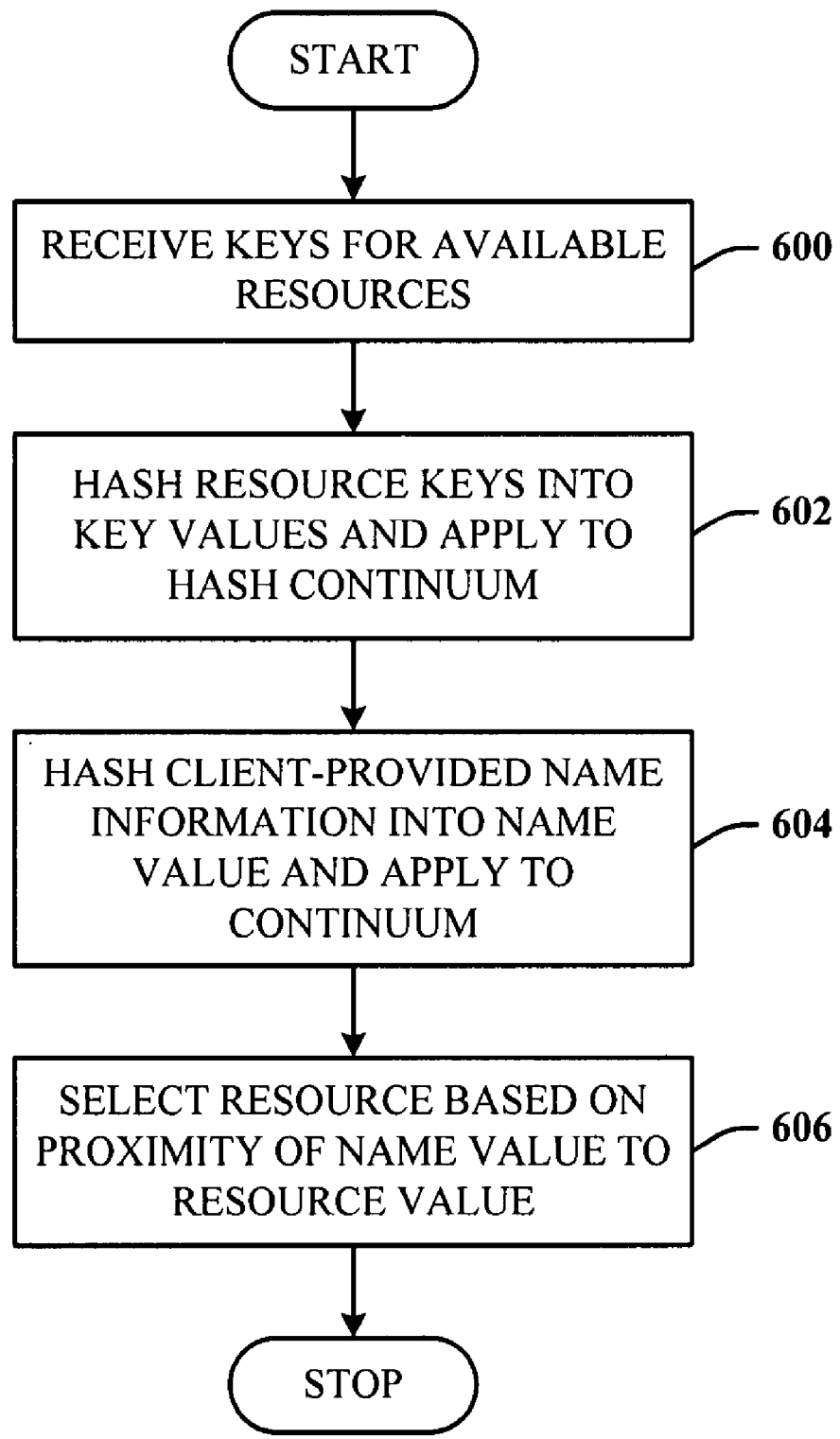
FIG. 6 illustrates a method of utilizing a hash for selecting a resource.

FIG. 6 illustrates a method of utilizing a hash for selecting a resource. At 600, resource keys are received from available resources. At 602, the keys are hashed into key values and applied to a hash continuum. At 604, the client-provided name information is hashed and applied to the hash continuum. At 606, a resource is selected based on proximity of the name value to a resource value.

Figure 7:
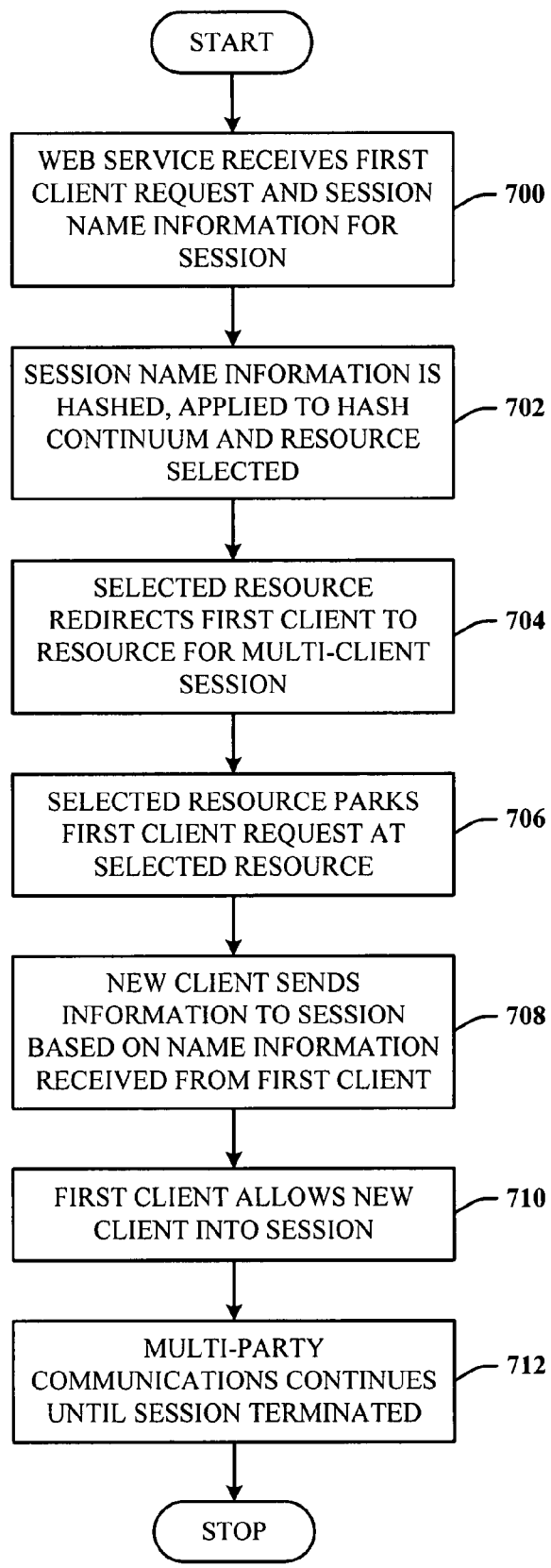
FIG. 7 illustrates an alternative method of generating and selecting network resources for multi-party communications.

FIG. 7 illustrates an alternative method of generating and selecting network resources for multi-party communications. At 700, an arbitrarily-selected web service with access to multiple session resources receives a client request for creation of a multi-party session. The request can also include session identifying information such as an e-mail address, client device name, MAC (media access control) address, or other uniquely-identifying information. Note that the identifying information need only be unique to the existing sessions. In other words a check can be performed by hashing the identifying information and checking the results against other existing hashed name or identifying information to ensure uniqueness at a point in time. If a conflict occurs, the client user can be notified to use an alternative name.

At 702, a session identifying information (also referred to as the name information) is hashed, applied to the hash continuum, and a resource selected. At 704, the selected source redirects the first client to the selected resource for a multi-client communications session. At 706, the selected resource parks the first client request at the selected resource. At 708, a new client sends information to the session based on the name information received from the first client. At 710, the first client allows the new client access to the session. At 712, the multi-party communications session continues until the session is terminated.

Figure 8:
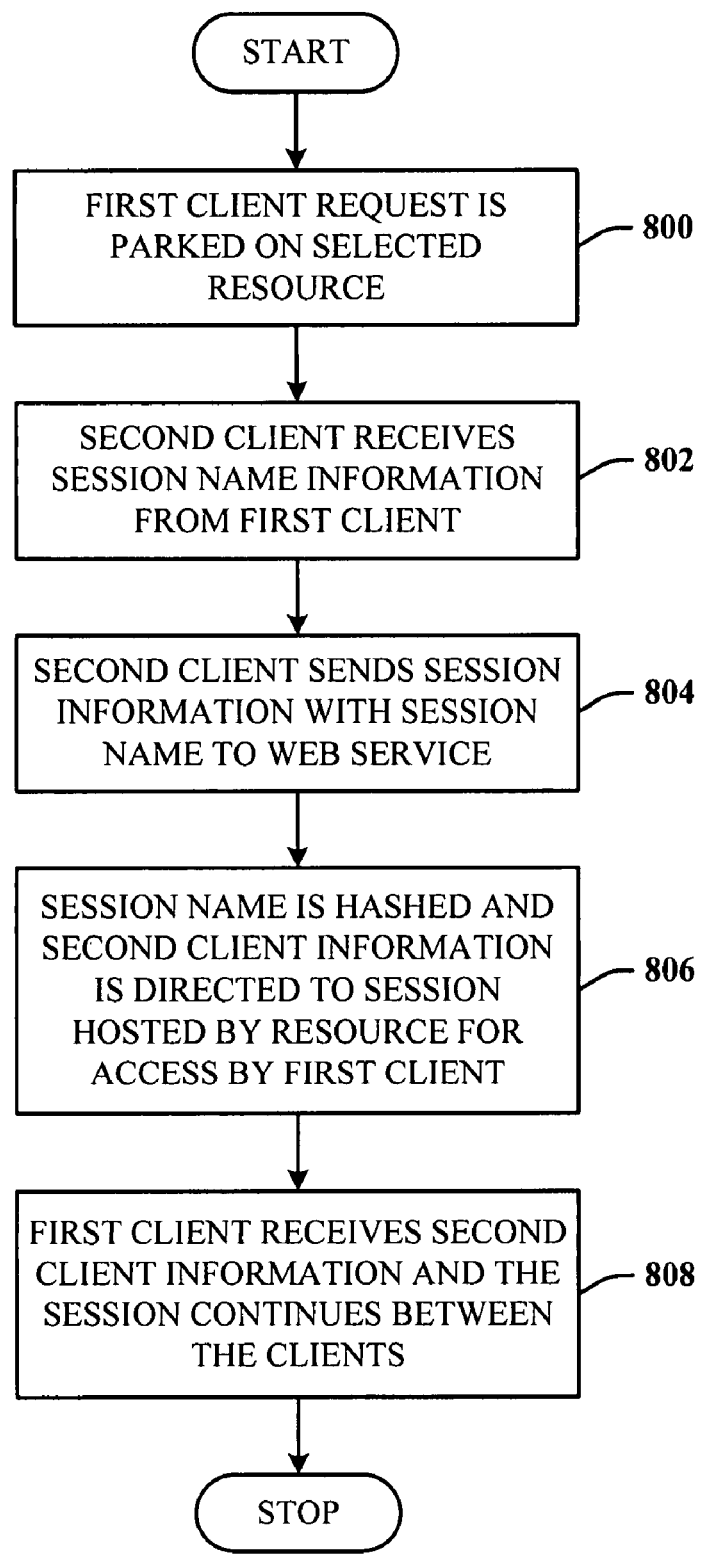
FIG. 8 illustrates a method of maintaining session communications during a session.

FIG. 8 illustrates a method of maintaining session communications during a session. At 800, a first client that initiated the session parks information at a selected resource. At 802, a second client receives the session name for the first client. At 804, the second client sends information with the session name to the web service. At 806, the session name is hashed and directs the associated second client information into the session hosted by the resource for access by the first client. At 808, the first client receives the second client information and the session continues.

Figure 9:
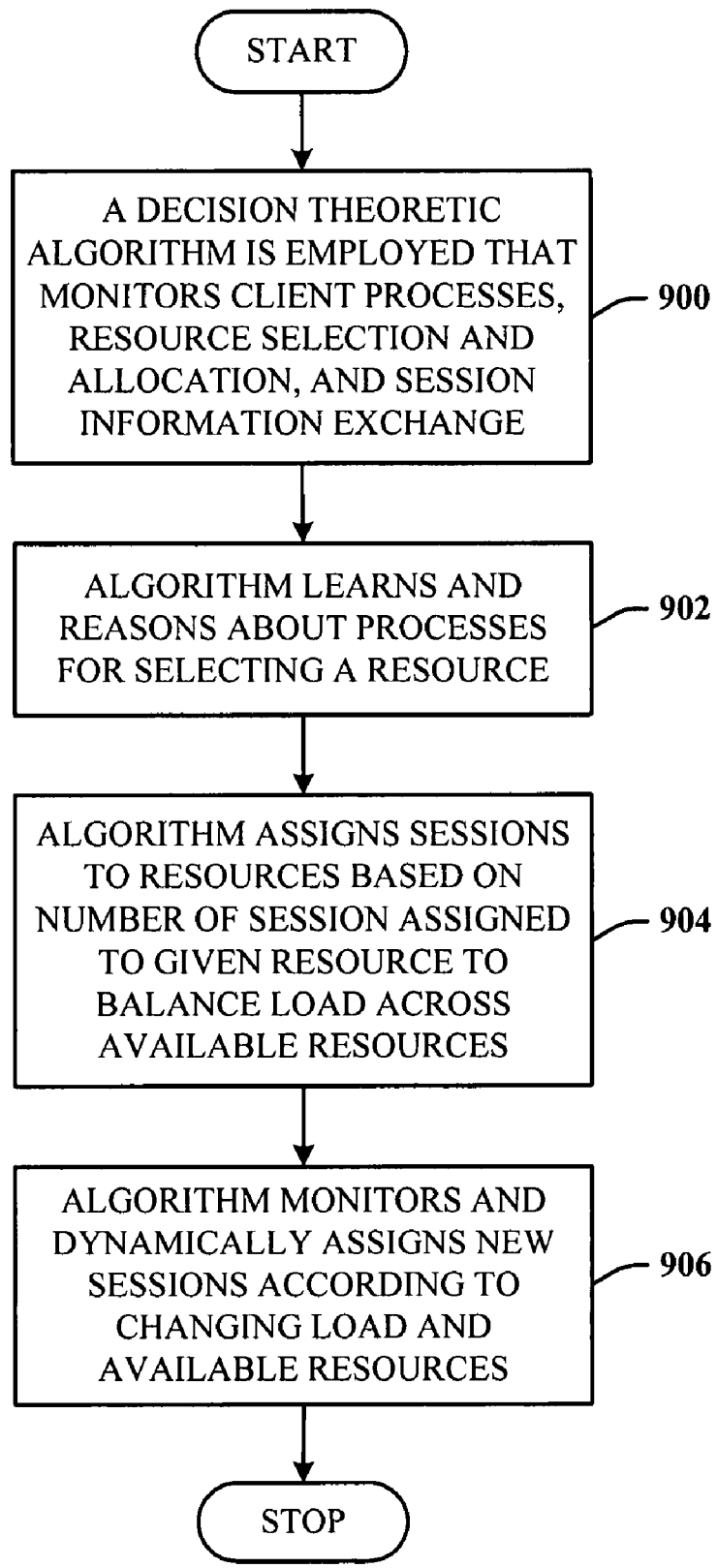
FIG. 9 illustrates a method of load balancing using a decision theoretic algorithm that monitors session processes.

FIG. 9 illustrates a method of load balancing using a decision theoretic algorithm that monitors session processes. At 900, the algorithm monitors client processes, resources selection and allocation, and session information exchange. At 902, the algorithm learns and reasons about the processes for selecting resources. At 904, the algorithm assigns sessions to resources based on the number of sessions assigned to a given resource to substantially even the session load across the available resources. At 906, the algorithm monitors and dynamically assigns new sessions according to the changing load.

Figure 10:
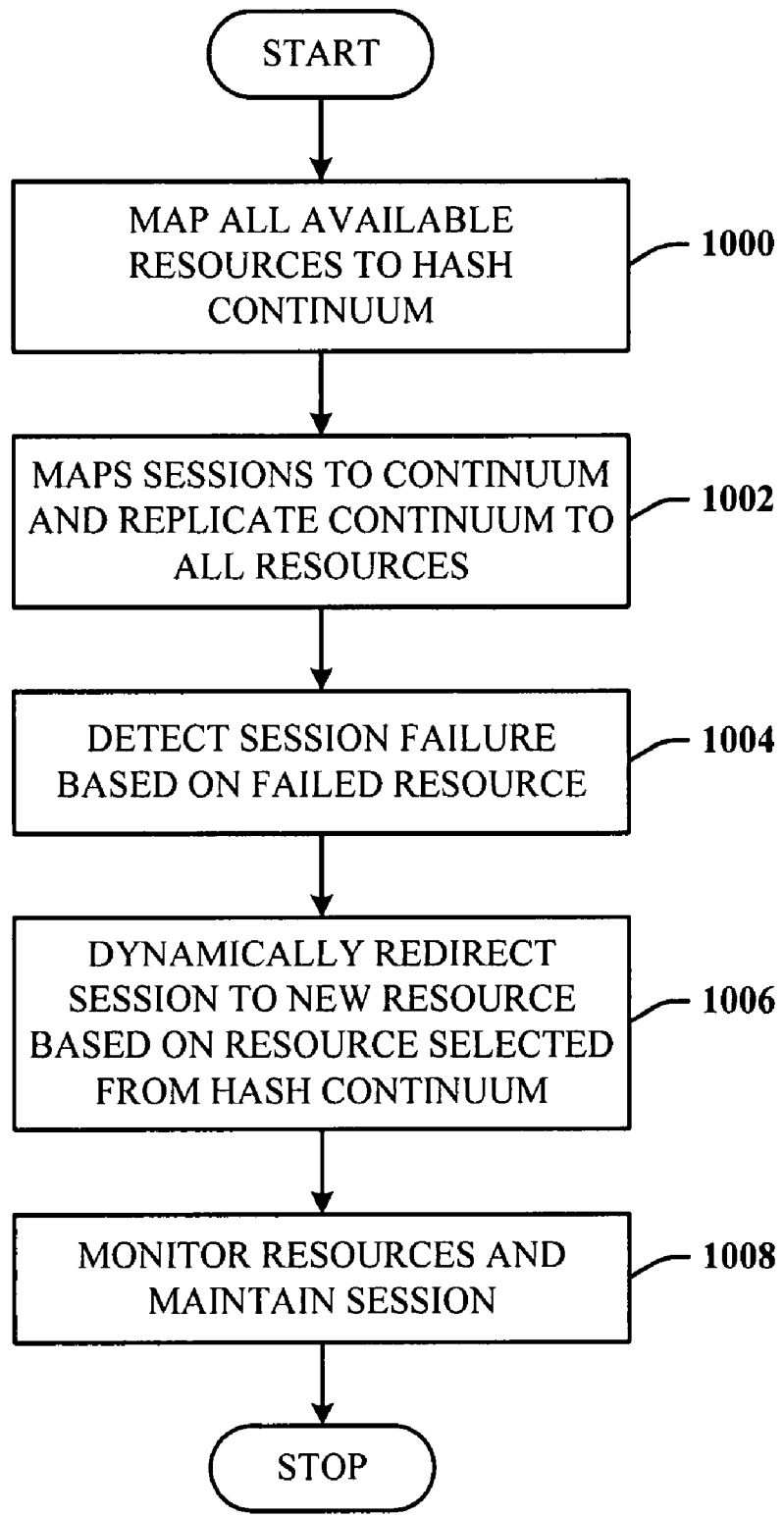
FIG. 10 illustrates a method of managing resources based on a failed resource.

FIG. 10 illustrates a method of managing resources based on a failed resource. At 1000, all available resources are mapped to a hash continuum. At 1002, sessions are mapped to the continuum and the continuum is replicated to all resources. At 1004, a session failure is detected based on a failed resource. At 1006, a session an associated clients are dynamically redirected to a new resource based on the new resource being selected from the latest version of the hash continuum. At 1008, the resources are monitored and session maintained and managed dynamically according to detected changes.

Figure 11:
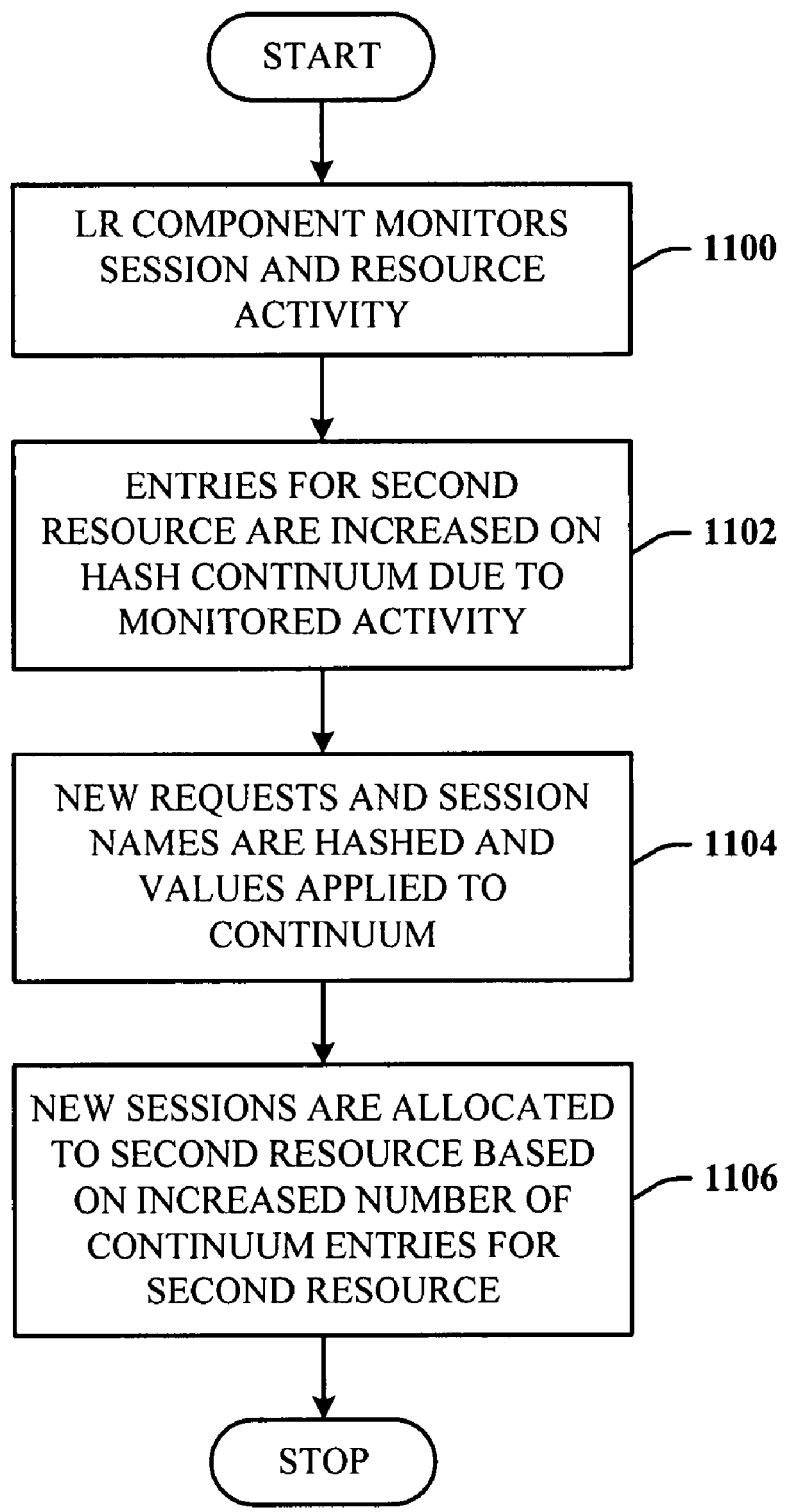
FIG. 11 illustrates a method of loading a resource via the hash continuum.

FIG. 11 illustrates a method of loading a resource via the hash continuum. At 1100, the learning and reasoning component monitors session and resource activity. At 1102, the number of resource entries for the second resource is increased in the hash continuum due to monitored activity. At 1104, as new requests for resources are received and processed, session names are hashed into name values and applied to the hash continuum. The probability that load will be allocated to the first resource is reduced due the increase in continuum entries for the second resource. At 1106, new sessions requests are processed for allocation to the second resource.

Figure 12:
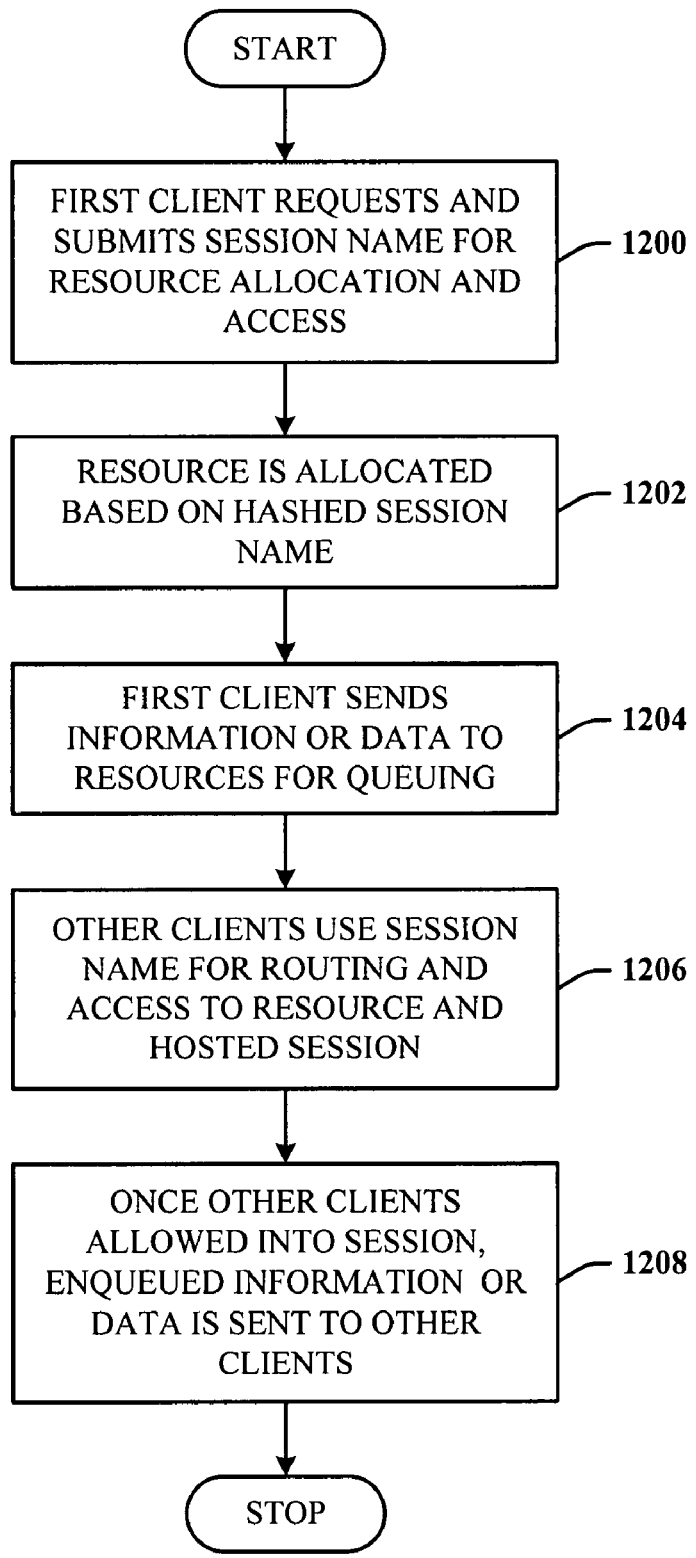
FIG. 12 illustrates a method of broadcasting to multiple parties based on access to a resource.

The disclosed architecture can function as a broadcast system. FIG. 12 illustrates a method of broadcasting to multiple parties based on access to a resource. At 1200, a first client requests and submits a session name for resource allocation and access. At 1202, a resource is allocated based on a hashed session name. At 1204, the first client submits message information or data to the resource for queuing once other clients access the session. At 1206, other clients use the session name for routing to the selected resource. At 1208, the clients are allowed access to the session and automatically receive the information or data enqueued by the resource.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
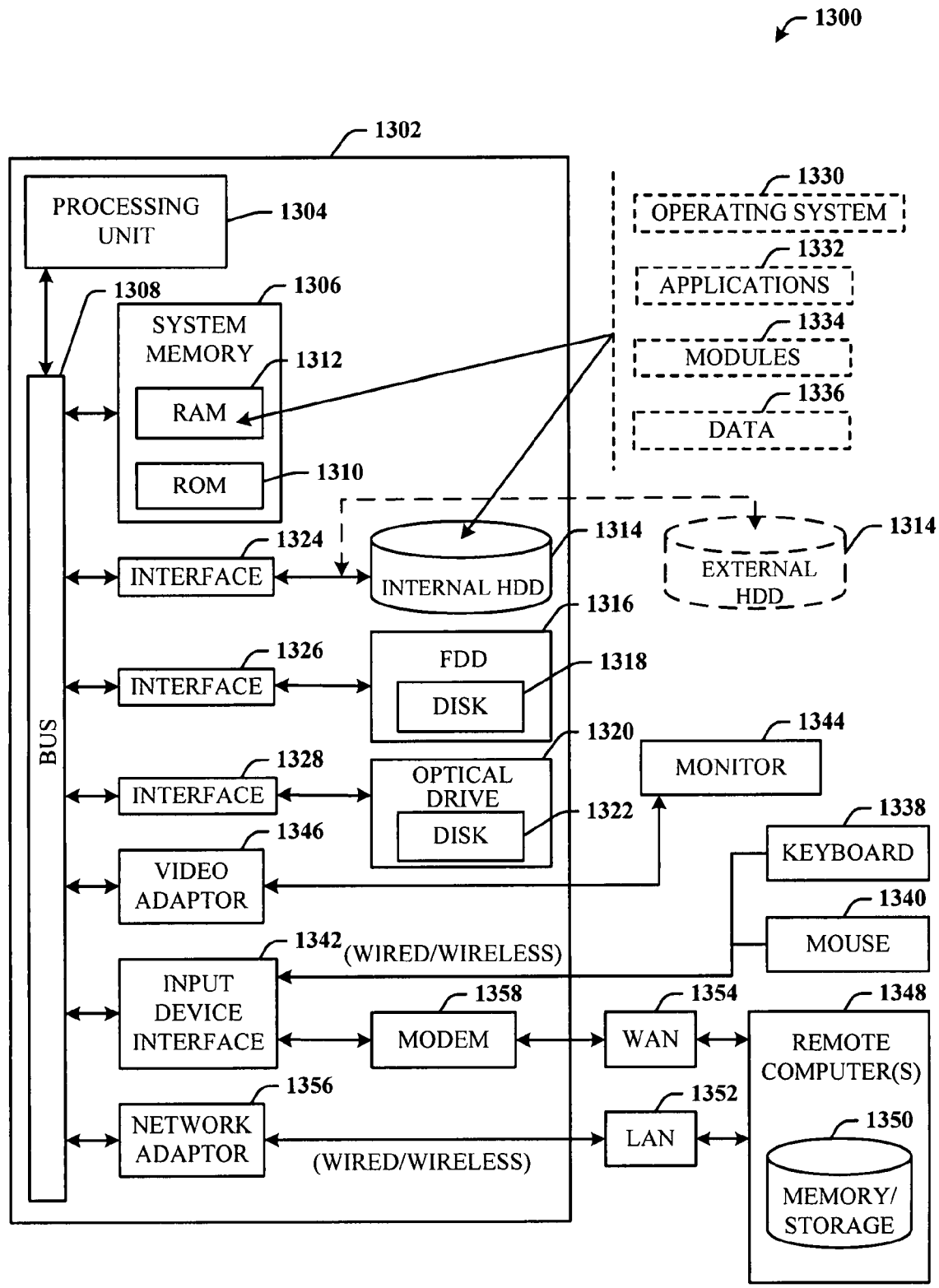
FIG. 13 illustrates a block diagram of a computing system operable to provide web service access and resource allocation in accordance with the disclosed architecture.

Referring now to FIG. 13, there is illustrated a block diagram of a computing system 1300 operable to provide web service access and resource allocation in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302, the computer 1302 including a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the disclosed architecture can be implemented with various commercially available operating systems or combinations of operating systems.

The applications 1332 and/or modules 1334 can comprise the web component 102, resource component hash 110, and/or resources 108 of FIG. 1, and the learning and reasoning component 306 of FIG. 3, for example.

A user can enter commands and information into the computer 1302 through one or more wired/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 14:
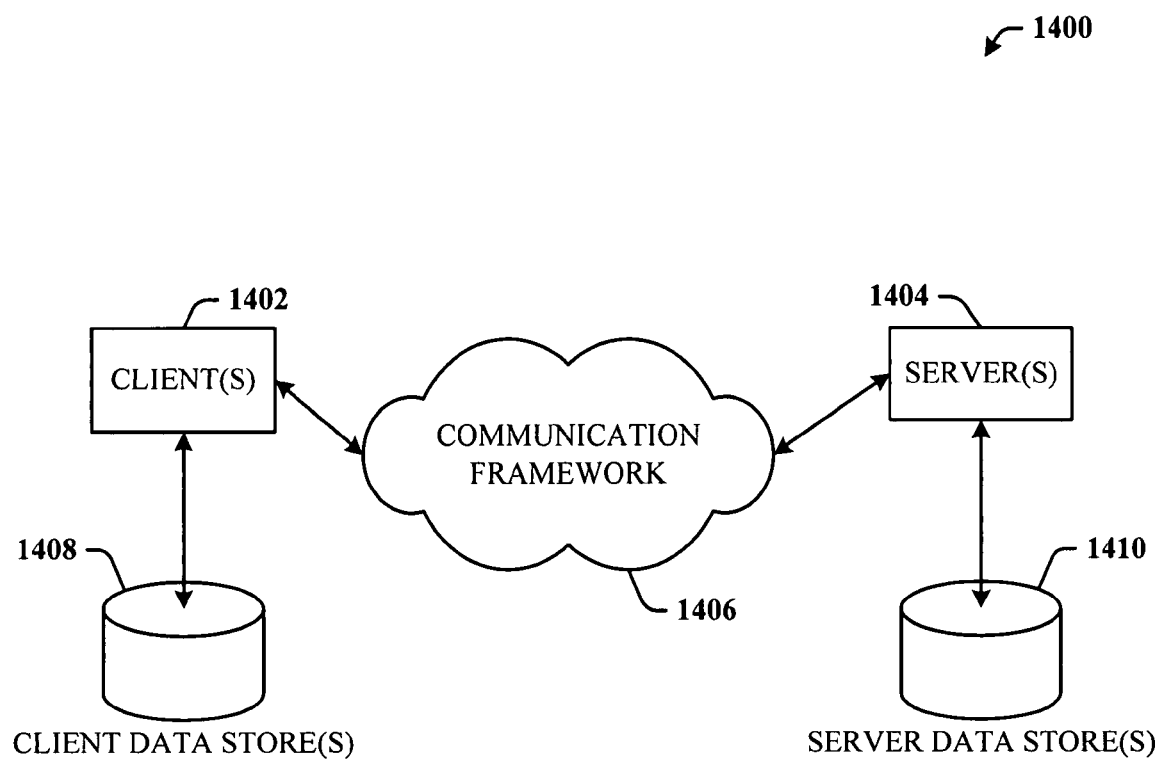
FIG. 14 illustrates a schematic block diagram of an exemplary computing environment for web-based access, session name processing and dynamic resource access.

Referring now to FIG. 14, there is illustrated a schematic block diagram of an exemplary computing environment 1400 for web-based access, session name processing and dynamic resource access. The system 1400 includes one or more client(s) 1402. The client(s) 1402 can be hardware and/or software (e.g., threads, processes, computing devices). The client(s) 1402 can house cookie(s) and/or associated contextual information, for example.

The system 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The clients 1402 can include the clients 104 of FIG. 1, and the clients 402 and 414 of FIG. 4. The servers 1404 can include the web component 102 of FIG. 1, the web service 302 of FIG. 3 and server 408 of FIG. 4, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented multi-client management system, comprising:
    a processor;
    a web component for receiving a request from a client for multiple client intercommunications; and
    a resource component for dynamically assigning by the processor a communications resource using a continuous hash, the resource assigned based on identifying information in association with the request, wherein the identifying information is hashed to a value of a hash continuum and the assigned resource is associated with a next higher resource value relative to the hashed identifying information of a client, wherein the resource component automatically manages loading of the resource by adjusting a total number of resource values on the hash continuum.

2. The system of claim 1, wherein the web component is accessed arbitrarily by the client.

3. The system of claim 1, wherein the hash continuum and associated resource values assigned to the continuum are replicated to other web services of the web component.

4. The system of claim 1, wherein the resource component automatically balances load between a plurality of the resources based on the continuous hash.

5. The system of claim 1, wherein the continuous hash maps the identifying information to the resource.

6. The system of claim 1, wherein the web component parks the request at the resource and redirects a second client to the resource for client intercommunications.

7. The system of claim 1, further comprising a machine learning and reasoning component that employs a probabilistic and/or statistical-based analysis to prognose or infer an action that is desired to be automatically performed.

8. A computer-implemented method of managing client communications, comprising:
    receiving a client request for a multi-client session via a web service, the request associated with a session name;
    selecting by a processor a network resource based on numerical proximity of a hash of the name to a resource value on a hash continuum;
    adjusting a total number of resource values on the hash continuum to manage loading of network resources with which the resource values are associated;
    storing the request at the selected network resource; and
    routing other clients to the network resource based on the name.

9. The method of claim 8, further comprising dynamically selecting a new resource and establishing the session on the new resource based on failure of the network resource.

10. The method of claim 8, wherein the network resource directs the other clients to the network resource.

11. The method of claim 8, wherein the web service is hosted on the selected network resource.

12. The method of claim 8, further comprising broadcasting information from the client to the other clients based on access by the other clients to the network resource.

13. The method of claim 8, further comprising parking the client request on the selected resource until at least one of the other client accesses a session associated with the session name.

14. The method of claim 8, further comprising maintaining a session associated with the session name based on changing information sent to the session by the client or the other clients.

15. A computer-implemented system, comprising:
    computer-implemented means for receiving a client request for a multi-client session via a web service, the request associated with a session name;
    computer-implemented means for selecting a network resource by a processor based on numerical proximity of a hash of the name to a resource value on a hash continuum;
    computer-implemented means for adjusting a total number of resource values on the hash continuum to manage loading of network resources with which the resource values are associated;
    computer-implemented means for storing the request at the selected network resource; and
    computer-implemented means for routing other clients to the network resource based on the name.

* * * * *